United States Patent Office 3,338,855
Patented Aug. 29, 1967

3,338,855
POLYBUTENE-1 PETROLEUM WAX BLENDS
Raymond J. Kray, Berkeley Heights, N.J., assignor to Allied Chemical Corporation, New York, N.Y., a corporation of New York
No Drawing. Filed Mar. 5, 1963, Ser. No. 263,067
2 Claims. (Cl. 260—28.5)

This invention relates to petroleum wax coating compositions widely used in forming protective coatings and for other purposes.

Petroleum wax, also called paraffin wax, melting within the range of about 120° to 150° F., is widely used as a coating for wrapping paper and paperboard in the production of low-cost cartons for liquids, notwithstanding that it has a tendency to flake and crack, particularly when the paperboard is flexed or creased. Flaking and cracking impairs the vapor and moisture barrier afforded by the coating. Moreover, flaking of the wax into the contents is obviously seriously objectionable.

The blending of polyethylene with paraffin wax to produce a paraffin wax-containing coating of better tensile strength and ductility is known. Wax blends containing polyethylene have the serious objection that they have a markedly greater cloud point, so much so that they require application of the coating at much higher temperatures than when using paraffin wax alone. This is a serious disadvantage particularly in the coating of cardboard stocks normally carried out at temperatures of 150–180° F. and occasionally as high as 212° F., even though the cardboard stock may be deleteriously affected at these higher temperatures.

Polypropylene, including high isotactic polypropylene, petroleum wax blends have the same objectionable characteristics as noted above in the case of polyethylene paraffin wax blends. In fact, petroleum wax polypropylene blends have appreciably higher cloud points than polyethylene paraffin wax blends.

In this specification, all percentages and parts are given on a weight basis.

In accordance with this invention, a polybutene-1 resin having an isotactic content of at least 50%, preferably from 75% to 95%, a molecular weight of from 10,000 to 2,000,000, preferably 80,000 to 800,000, is blended with petroleum wax in the proportions of from 5% to 95%, preferably 10% to 40%, resin to 95% to 5%, preferably 90% to 60%, petroleum wax.

In this specification, the expression "isotactic" is used in its conventional sense to mean the material in the polymer remaining after extraction with diethyl ether; the isotactic material is substantially insoluble in hexane and naphtha. The diethyl ether extraction removes the amorphous or atactic material (which is the material soluble in hexane and naphtha) and leaves a polymer containing the isotactic material.

The polybutene-1 resin employed in forming the paraffin wax blends of the present invention can be prepared by polymerizing butene-1 using a Ziegler type catalyst and conducting the polymerization under conditions to produce a polymer having the desired isotactic content of at least 50% and desired molecular weight of at least 10,000. Any of the known Ziegler catalysts can be used; for example, catalysts obtained by reaction between compounds of metals of group IV–A (titanium, zirconium, hafnium or thorium), V–A (vanadium, columbium or tantalum), VI–A (chromium, molybdenum, tungsten or uranium) with alkyl compounds of aluminum or a metal of group II (beryllium, magnesium, calcium, strontium, barium, zinc or cadmium). Polybutene produced by polymerization using stereospecific catalysts such as $CrO_3$ on an $SiO_2$–$Al_2O_3$ support or a catalyst consisting of a promoted $MoO_3$ may also be used. In all cases the polymerization must be timed and moderated to produce a polybutene-1 having the desired molecular weight in excess of 10,000 and isotactic content in excess of 50% by weight. Hydrogen can be introduced into the polymerization reaction mixture to control the molecular weight and percent isotacticity. Polybutene-1 polymers having an isotactic content of at least 50% and a molecular weight in excess of 10,000 produced by any known procedure can be used.

As an alternative to the direct polymerization of the starting butene-1, degradation of higher molecular weight polybutene-1 to a desired starting molecular weight resin having an isotactic content in excess of 50% by weight can be employed. Such degradation may be catalytic, thermocatalytic or thermal. One example of such degradation is disclosed in copending application Ser. No. 152,664, filed Nov. 15, 1961, now Patent No. 3,198,779. The degraded polybutene-1 of the same molecular weight as the directly polymerized butene-1 gives blends of lower melt viscosities. Hence where blends having such lower melt viscosities are desired, it is preferred to employ degraded polybutene-1 resins having molecular weights of at least 10,000 and isotacticities of at least 50%.

Surprisingly, polybutene-1 resins having the above noted isotactic contents and molecular weights blend readily with petroleum wax and result in coating compositions having a combination of desirable properties, not heretofore obtainable in paraffin wax coating compositions, including such compositions containing heretofore known additives or blending agents compatible with the wax. The blends of petroleum wax with polybutene-1 embodying this invention surprisingly show markedly improved hardness and less tendency to flake, and this without appreciable increase in the cloud point or increase in the viscosity of the coating composition at coating temperatures such that they require heating to a temperature appreciably higher than that required for the application of petroleum wax coating compositions consisting of petroleum wax alone.

These characteristics of polybutene-1 petroleum wax blends embodying this invention, namely, that the resultant blends have cloud points not appreciably greater than that of the paraffin wax alone and the blends at normal or usual coating temperatures have a viscosity such that they are fluid and can readily be applied at such temperatures, are important, unobvious advantages of the present invention. Curtain coaters currently and commonly employed in the coating of cardboard stock with paraffin wax and paraffin wax blends for satisfactory operation require blends which have cloud points not greatly in excess of the melting temperature of the paraffin wax alone. Moreover, it is desirable to coat at as low a temperature as possible to minimize contraction of the coating, avoid degradative effects which take place at higher temperatures, and to economize on the heat required in effecting the coating.

The polybutene-1 resins herein disclosed are compatible with paraffin wax at temperatures conveniently close to the melting point of the wax itself and do not materially alter the coating characteristics of paraffin wax. Hence the blends of this invention can be used efficiently in current curtain coaters.

As compared with coating compositions consisting of petroleum wax alone and blends thereof with polyethylene, polypropylene or other heretofore known blending agents, blends of petroleum wax and polybutene-1 embodying this invention exhibit superior gloss, superior hardness, less tendency to flake, increased tensile strength, increased flexural strength and increased softening point.

The marked improvement in cloud point of petroleum wax polybutene-1 blends embodying this invention, as compared with blends containing the same proportion of polyethylene or polypropylene, is evident from Table I which follows. In this table the cloud point data is given in ° C. on a blend containing 10% of the identified olefin polymer with 90% paraffin wax. The wax used is a typical commercial paraffin wax having an approximate melting point of 145.5° F. (63° C.) and melting within the range of 143-148° F. (approximately 61-64° C.) sold by the Atlantic Refining Company as paraffin 1115 and herein referred to as paraffin 1115. This paraffin wax is also employed in all of the comparative data and in the examples given in this specification.

TABLE I

|  | Molecular Weight | Percent Isostatic | Cloud Point, ° C. |
|---|---|---|---|
| Polyethylene | 2×10³ |  | 85 |
| Do | 21×10³ |  | 96 |
| Polypropylene | 31×10³ | 90 | 107 |
| Do | 300×10³ | 90 | 115 |
| Polybutene-1 | 77×10³ | 92 | 62 |
| Do | 390×10³ | 99 | 63 |
| Do | 825×10³ | 70 | 62 |
| Paraffin Wax |  |  | 61 |

The improvement in melt viscosity obtained by blending a degraded polybutene-1 resin as compared with the directly polymerized polybutene-1 resin is apparent from Table II which follows giving the data on melt viscosities of comparative blends, each containing 20% of the indicated polybutene-1 resin and 80% of the paraffin 1115.

TABLE II

|  | Molecular Weight | Percent Isotacticity | Melt Viscosity, cps. |
|---|---|---|---|
| Degraded Polybutene-1 | 22×10³ | 97 | 52 |
| Directly Polymerized Polybutene-1 | 26×10³ | 92 | 70 |

The blending of polybutene-1 with the paraffin wax can be effected in any known or desired manner. A typical procedure for effecting such blending is described below.

A three necked flask equipped with an electric drive stirrer, a thermometer, and a nitrogen inlet tube is charged with a measured amount of paraffin wax. The wax is heated under nitrogen with moderate stirring until a clear liquid results. To the melted wax is added a charge of polybutene-1 in amount herein disclosed. The mixture is heated to 140-150° C. and stirred to assist solution. The mixture can be maintained under a continuous blanket of nitrogen during the heating and stirring, if desired, and particularly when the heating is carried out under higher temperatures than 150° C. Such blanket is not necessary when operating at 140-150° C. The polybutene-1 charge is completely dissolved in the wax in approximately one-half hour; this is evident upon visual inspection. Desirably, however, heating of the blend is continued for an additional one-quarter hour to insure complete dissolution of the resin in the wax. The blend is thereupon allowed to cool to ambient temperature.

In this specification molecular weight values given were determined by solution-viscosity measurements (see R. Chiang, Journal Polymer Science, 28, 235, 1958). Melt viscosities were obtained at 100° C. with a Brookfield Synchro-Lectric viscometer, Model R.V.T. Hardness values were obtained using a penetrometer according to ASTM D-1321-57T, using a standard needle and a weight of 50 grams. Ring and ball softening points were obtained according to ASTM E-28-58T. Cloud points were obtained according to ASTM D-97-57. Flaking propensity was indexed by measuring the amount of material sloughed off during a fixed degree of abrasion as disclosed in ASTM 1044-56 using a CS 17 Calabrase abrasive wheel at 10 cycles with a 250 gram load.

In Table III which follows are given the properties of blends of paraffin wax and polybutene-1 in the proportions indicated in this table as well as properties of the same paraffin wax alone. The blends were produced following the typical procedure hereinabove given. These blends exemplify preferred embodiments of the present invention. It will be appreciated, however, that this invention is not limited to these examples.

TABLE III.—PART 1

|  | Example No. | | | | | |
|---|---|---|---|---|---|---|
|  | I | II | III | IV | V | VI |
| Wax | 100 | 90 | 90 | 60 | 40 | 90 | 80 |
| Polybutene-1 |  | 10 | 10 | 40 | 60 | 10 | 20 |
| Percent Isotacticity |  | 73 | 95 | 73 | 73 | 90 | 90 |
| Molecular Weight |  | 34,000 | 77,000 | 34,000 | 34,000 | 85,000 | 85,000 |
| Hardness | 13 | 7.7 | 6.5 | 6.0 | 4.2 | 6.9 | 5.5 |
| Melt Viscosity at 100° C., cps | 9 | 40 | 51 | 304 | 2,000 | 55 | 338 |
| Softening Point, ° C | 63 | 67 | 76 |  |  | 77 | 85 |
| Flaking Characteristics | .0130 | .0069 |  | .0013 | .001 | .0049 | .0027 |
| Cloud Point, ° C |  | 61.5 | 63 |  |  | 62.5 |  |

PART 2

|  | Example No. | | | | |
|---|---|---|---|---|---|
|  | VII | VIII | IX | X | XI |
| Wax | 90 | 80 | 90 | 80 | 80 |
| Polybutene-1 | 10 | 20 | 10 | 20 | 20 |
| Percent Isotacticity | 95 | 93 | 92 | 92 | 61 |
| Molecular Weight | 102,000 | 135,000 | 168,000 | 168,000 | 338,000 |
| Hardness | 6.5 | 4.8 | 7.2 | 5.1 | 8.7 |
| Melt Viscosity at 100° C., cps | 94 | 1,830 | 163 | 2,056 | 1,000 |
| Softening Point, ° C | 75.5 | 84.3 | 76.7 |  | 78.2 |
| Flaking Characteristics | .0051 | .0031 |  |  | .0036 |
| Cloud Point, ° C | 63.0 | 64.0 | 63.5 | 64.0 | 65.0 |

In Table IV which follows is given a comparison between the hardness and cloud point of a paraffin wax, atactic polybutene-1 blend and a blend embodying this invention. Note that the atactic polybutene results in a blend having a hardness less than that of the wax whereas the blends of this invention result in a blend having greatly improved hardness. Note also the marked increase in softening point of the blend of this invention as compared with the blends containing the atactic polybutene, and this with practically no change in the cloud point.

TABLE IV

|  | Wax | Comparative Blend | Example XII |
|---|---|---|---|
| Wax | 100 | 80 | 80 |
| Polybutene-1 |  | 20 | 20 |
| Percent Isotacticity |  | 0 | 73 |
| Molecular Weight |  | 46,000 | 34,000 |
| Hardness | 13 | 15.5 | 6.6 |
| Softening Point, °C | 63 | 64 | 72 |
| Cloud Point, °C | 61 | 64 | 62 |

The physical properties of exemplary polybutene-1 paraffin wax blends are given in Table V which follows. In Examples XIII and XIV the polybutene-1 resin had an isotacticity of 92% and was blended with the wax (paraffin 1115 as noted was used in all the examples) in the ratio of 20 parts resin and 80 parts wax. In Examples XV and XVI the isotacticity of the polybutene resin was 87%, and in Example XV 40 parts resin was blended with 60 parts wax, whereas in Example XVI 60 parts resin was blended with 40 parts wax. Examples XVII, XVIII and XIX utilized a polybutene resin having an isotacticity of 70% blended respectively in the proportions of 40, 60 and 80 parts of resin per 60, 40 and 20 parts of wax. Example XX involved a blend of 60 parts of polybutene resin having an isotacticity of 94% with 40 parts wax, and Example XXI involved a blend of 40 parts of polybutene resin having an isotacticity of 82% with 60 parts of the wax.

extrusion in that the blend has a higher melt index (better flow), higher tensile strength, modulus and impact strength.

The improvement effected in abrasion-resistance in paraffin wax coatings, or reduced tendency to flake, by incorporating therein by blending therewith the polybutene resins herein disclosed is demonstrated by the data contained in Table VII which follows, which table gives the results of surface abrasion tests on the indicated polybutene wax blends of certain of the aboxe examples and on the wax alone. The test procedure is disclosed in ASTM 1044–56, i.e., the same test procedure as referred to herein for the determination of flaking propensity. The values indicate the weight loss in grams.

TABLE VII

| Example No. | Paraffin Wax 115 | | | | Weight Loss, .0130 |
|---|---|---|---|---|---|
|  | Percent wax | Percent Polybutene | Percent Isotacticity | Molecular Weight |  |
| I | 90 | 10 | 73 | 34,000 | .0069 |
| III | 60 | 40 | 73 | 34,000 | .0013 |
| IV | 40 | 60 | 73 | 34,000 | .0010 |
| V | 90 | 10 | 90 | 85,000 | .0049 |
| VI | 80 | 20 | 90 | 85,000 | .0027 |
| VIII | 80 | 20 | 93 | 135,000 | .0031 |
| XI | 80 | 20 | 61 | 338,000 | .0018 |
| XII | 80 | 20 | 73 | 34,000 | .0042 |

It will be noted from the above examples that the blends embodying this invention have softening points below 100° C., not appreciably above the softening point of the paraffin wax alone, and hence are eminently satisfactory for use in current coating machines, including curtain coaters, in which the coating is carried out at relatively low temperatures. As is evident from the data given in Table I, the cloud point of the blends of the present invention is only slightly above that of the wax alone. From Table III it is evident that the blends embodying

TABLE V.—PHYSICAL PROPERTIES OF POLYBUTENE PARAFFIN BLENDS

| Example No. | Polybutene Molecular Weight | Ultimate Tensile Strength, p.s.i. | Ultimate Percent Elongation | Modulus | Impact Strength | Melt Index 190° C., 44 p.s.i. |
|---|---|---|---|---|---|---|
| XIII | 77,000 | 206 | 0.85 | 31,000 |  |  |
| XIV | 168,000 | 345 | 2 | 32,000 |  |  |
| XV | 570,000 | 860 | 150 | 28,000 | 25 |  |
| XVI | 570,000 | 2,030 | 275 | 26,000 | 170 | 16.3 |
| XVII | 820,000 | 736 | 275 | 16,000 | 18 |  |
| XVIII | 820,000 | 1,520 | 350 | 14,000 | 200 | 34 |
| XIX | 820,000 | 2,090 | 350 | 5,000 | 320 | 1.7 |
| XX | 840,000 | 2,130 | 250 | 24,000 | 190 | 8.5 |
| XXI | 1,350,000 | 920 | 240 | 20,000 | 9 |  |

The superiority of the polybutene paraffin wax blends as compared with a low density polyethylene wax of the type commonly used for melt extrusions is demonstrated by the data in Table VI which follows. This table compares the indicated properties of a blend containing 60% of polybutene having a molecular weight of 840,000 and 94% isotacticity with a low density polyethylene having a molecular weight of 21,000.

TABLE VI

|  | Polybutene Wax Blend | Low Density Polyethylene |
|---|---|---|
| Ultimate Tensile strength, p.s.i. | 2,130 | 1,800 |
| Modulus | 24,000 | 23,000 |
| Impact Strength | 190 | 130 |
| Melt Index, 190° C., 44 p.s.i. | 8.5 | 2.0 |

From the data in Table VI it is evident that polybutene wax blend is superior to low density polyethylene for melt this invention have a viscosity such that they are eminently satisfactory for use in available coaters which operate satisfactorily when coating materials having a melt viscosity at 100° C. not exceeding about 2,100 cps. are employed. The resultant solidified coating is also superior to prior known wax and wax blend coatings exhibiting marked improvement in surface characteristics, particularly minimization of tendency to flaking.

That polybutene-1 resins having the relatively high isotacticity and molecular weights herein disclosed produce blends having such low cloud points is indeed surprising and unexpected. Isotactic lower alpha-olefin polymers, for example, polypropylene, result in paraffin wax blends having such high cloud points as to make the blends unsuitable for use in curtain coating machines and wherever a low cloud point is required for the production of a satisfactory coating, particularly coatings applied at temperatures below 100° C. to minimize degradation of the coating material and the substrate to which it is applied.

Surprisingly, the polybutene-1 resins having the isotactic contents and molecular weights herein disclosed, notwithstanding their relatively high molecular weight and high isotactic content, are compatible with paraffin wax and when blended therewith do not impart to the blend processing difficulties in the use thereof as compared with the use of unmodified paraffin wax alone. The high molecular weight and isotacticity, unavailable in wax additives heretofore employed compatible with the petroleum wax, contribute to the coating produced by the blend embodying this invention unusual hardness, resistance to flaking, scuff resistance as well as the other desirable properties hereinabove pointed out.

While the blends embodying the present invention are eminently satisfactory for use as curtain coating melts, it will be understood that the invention is not limited thereto and these blends can be employed for other purposes wherever a paraffin wax composition of improved hardness and less flaking tendency and low cloud point finds application. Hot melt polybutene wax blends of this invention can be applied by roll coating techniques on foil, parchment, kraft, glassine, chipboard and other paper stocks to produce packaging materials having an attractive gloss and good moisture and crease resistance. With the blends of this invention the temperature to deposit an even coating of predetermined thickness need be only a few degrees above the softening point of the wax alone, which is generally in the range of 61–64° C. Upon solidification of the coating on the substrate, the substrate has a coating on the opposite sides thereof of improved hardness as compared with such coatings consisting of the wax alone or wax with other known blending agents, improved gloss, improved tensile strength, improved impact strength and markedly improved resistance to abrasion and flaking.

Since certain changes in the petroleum wax polybutene-1 blends embodying this invention can be made without departing from the scope of this invention, it is intended that all matter contained in the description shall be interpreted as illustrative and not in a limiting sense.

What is claimed is:

1. A petroleum wax blend containing as its essential constituents from about 40% to 95% by weight of petroleum wax and from about 5% to 60% by weight of polybutene-1 resin having a molecular weight of from 80,000 to 800,000 and an isotactic content of from 75% to 95%, said blend having a cloud point not appreciably higher than that of the petroleum wax constituent of said blend.

2. A petroleum wax blend containing as its essential constituents from about 40% to 95% petroleum wax having a melting point within the range of from 120° to 150° F. and from about 5% to 60% polybutene-1 resin having a molecular weight of from 80,000 to 800,000 and an isotactic content of from 75% to 95%, the blend having a cloud point not appreciably greater than that of the petroleum wax, and having a melt viscosity at 100° C. not exceeding 2100 cps.

References Cited

UNITED STATES PATENTS

| 2,290,393 | 7/1942 | Thomas | 260—28.5 |
| 2,728,735 | 12/1955 | Anderson | 260—28.5 |
| 2,824,089 | 2/1958 | Peters et al. | 260—88.1 |

FOREIGN PATENTS

| 620,375 | 5/1961 | Canada. |

OTHER REFERENCES

Gaylord et al.: Linear and Stereoregular Addition Polymers, Interscience Publishers, Inc., New York, page 129, 1959, page 663.

MORRIS LIEBMAN, *Primary Examiner.*

D. C. KOLASCH, B. A. AMERNICK,
*Assistant Examiners.*